United States Patent
Wang et al.

(10) Patent No.: US 10,993,226 B2
(45) Date of Patent: Apr. 27, 2021

(54) SUBFRAME INDICATION METHOD AND DEVICE

(71) Applicant: Huawei Technologies Co., Ltd., Shenzhen (CN)

(72) Inventors: Da Wang, Shenzhen (CN); Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 56 days.

(21) Appl. No.: 16/332,081

(22) PCT Filed: Sep. 30, 2016

(86) PCT No.: PCT/CN2016/101411
§ 371 (c)(1),
(2) Date: Mar. 11, 2019

(87) PCT Pub. No.: WO2018/058688
PCT Pub. Date: Apr. 5, 2018

(65) Prior Publication Data
US 2019/0215830 A1    Jul. 11, 2019

(51) Int. Cl.
*H04W 72/04* (2009.01)
*H04L 5/00* (2006.01)
(Continued)

(52) U.S. Cl.
CPC ....... *H04W 72/0446* (2013.01); *H04L 5/0044* (2013.01); *H04L 5/0053* (2013.01);
(Continued)

(58) Field of Classification Search
CPC ........... H04W 72/042; H04W 72/0446; H04W 74/0833; H04W 72/1289; H04W 74/0808;
(Continued)

(56) References Cited

U.S. PATENT DOCUMENTS

2009/0257366 A1* 10/2009 Power ................... H04L 5/0037
370/280
2010/0226648 A1    9/2010 Katagiri et al.
(Continued)

FOREIGN PATENT DOCUMENTS

CN    101753507 A    6/2010
CN    101945334 A    1/2011
(Continued)

OTHER PUBLICATIONS

Machine Translation and Abstract of Chinese Publication No. CN101753507, Jun. 23, 2010, 15 pages.
(Continued)

*Primary Examiner* — Natasha W Cosme
(74) *Attorney, Agent, or Firm* — Conley Rose, P.C.

(57) ABSTRACT

Embodiments of the present invention provide a subframe indication method and a device. A first device determines subframe indication information that indicates at least one of uplink control signaling, downlink control signaling, and data of a first subframe, and sends the subframe indication information to a second device, so that the second device determines a type of the first subframe based on the subframe indication information. In this process, the first device needs to send, to the second device, only the subframe indication information that indicates at least one of parts of the first subframe, and the second device may determine the type of the first subframe based on the subframe indication information, so as to reduce overheads of the subframe indication information.

20 Claims, 8 Drawing Sheets

(51) Int. Cl.
*H04W 72/12* (2009.01)
*H04L 5/14* (2006.01)

(52) U.S. Cl.
CPC ....... *H04W 72/0406* (2013.01); *H04L 5/0091* (2013.01); *H04L 5/14* (2013.01); *H04W 72/1278* (2013.01)

(58) Field of Classification Search
CPC ......... H04W 72/0413; H04W 72/0453; H04W 76/27; H04W 56/001; H04W 72/04; H04W 16/14; H04W 92/18; H04W 24/08; H04W 24/10; H04W 72/14; H04W 74/006; H04W 88/02; H04W 48/16; H04W 72/0406; H04W 56/00
See application file for complete search history.

(56) References Cited

U.S. PATENT DOCUMENTS

| | | | |
|---|---|---|---|
| 2012/0147792 A1* | 6/2012 | Zhang | H04B 7/2656 370/279 |
| 2015/0085723 A1 | 3/2015 | Chen et al. | |
| 2015/0092762 A1 | 4/2015 | Li et al. | |
| 2017/0325227 A1 | 11/2017 | Li et al. | |
| 2018/0007688 A1 | 1/2018 | Fu et al. | |

FOREIGN PATENT DOCUMENTS

| | | |
|---|---|---|
| CN | 103458513 A | 12/2013 |
| CN | 103517421 A | 1/2014 |
| CN | 103560850 A | 2/2014 |
| CN | 105743626 A | 7/2016 |
| WO | 2016119103 A1 | 8/2016 |
| WO | 2016148876 A1 | 9/2016 |
| WO | 2016148878 A1 | 9/2016 |

OTHER PUBLICATIONS

Machine Translation and Abstract of Chinese Publication No. CN101945334, Jan. 12, 2011, 19 pages.
Foreign Communication From a Counterpart Application, PCT Application No. PCT/CN2016/101411, English Translation of International Search Report dated Jun. 29, 2017, 2 pages.
Foreign Communication From a Counterpart Application, PCT Application No. PCT/CN2016/101411, English Translation of Written Opinion dated Jun. 29, 2017, 4 pages.
Linnan, L., et al., "TD-LTE Subframe Configuration Study," Sep. 15, 2013, China Mobile Research Institute, 14 pages.
ZTE, et al, "Frame structure design for NR," 3GPP TSG RAN WG1 Meeting #85, R1-164274, Nanjing, China, May 23-27, 2016, 11 pages.

* cited by examiner

Scheduling uplink data across subframes

Scheduling uplink data across subframes

Scheduling downlink data across subframes

Subframe feedback

Cross-subframe feedback

Cross-subframe feedback

SUBFRAME INDICATION METHOD AND DEVICE

CROSS-REFERENCE TO RELATED APPLICATIONS

This application is a U.S. National Stage of International Patent Application No. PCT/CN2016/101411 filed on Sep. 30, 2016, which is hereby incorporated by reference in its entirety.

TECHNICAL FIELD

Embodiments of the present invention relate to the field of communications technologies, and in particular, to a subframe indication method and a device.

BACKGROUND

With continuous development of technologies, a self-contain (self-contain) subframe gradually evolves in future 5th generation mobile communications (the 5th Generation Mobile Communications, 5G). Different from an uplink subframe or a downlink subframe in Long Term Evolution (Long Term Evolution, LTE), the self-contain subframe includes downlink control signaling, uplink control signaling, downlink data, and/or uplink data in a time interval (time interval). When the self-contain subframe includes both the downlink control signaling and the uplink data, a gap (Gap) exists between the downlink control signaling (for example, uplink scheduling information) and the uplink data, and the gap is used for uplink and downlink conversion and is used by user equipment (User Equipment, UE) to prepare the uplink data.

FIG. 1 is a schematic structural diagram of a self-contain subframe. Referring to FIG. 1, symbols of the self-contain subframe are sequentially occupied by downlink control signaling (for example, a part filled with horizontal lines), downlink data (for example, a part filled with vertical lines), a gap (for example, a blank part), uplink data (for example, a part filled with slash lines), and uplink control signaling (for example, a part filled with grids) from left to right, to show a most basic type of self-contain subframe. In practice, the self-contain subframe in FIG. 1 may be transformed, to obtain another type of self-contain subframe. For example, symbols occupied by the gap, the uplink data, and the uplink control signaling are changed to 0, to obtain a self-contain subframe that includes only the downlink control signaling and the downlink data. For another example, symbols occupied by the downlink control signaling, the downlink data, the gap, and the uplink control signaling are changed to 0, to obtain a self-contain subframe that includes only the uplink data. In a communication process, a network side device needs to indicate a subframe type of a self-contain subframe to the UE, so that the UE determines, based on the subframe type, a part included in the self-contain subframe, so as to send the uplink control signaling or the uplink data, or receive the downlink data or the downlink control signaling.

However, in the self-contain subframe, eight types of self-contain subframes may be obtained by transforming the basic type according to FIG. 1. Further, in each type of subframe, data of symbols occupied by each part is changeable, and more types of self-contain subframes may be further obtained. Consequently, overheads of signaling that indicates the subframe type are very large.

SUMMARY

Embodiments of the present invention provide a subframe indication method and a device, so as to reduce overheads of subframe indication information.

According to the first aspect, an embodiment of the present invention provides a subframe indication method. The method is described from a perspective of a first device. In the method, the first device determines subframe indication information that indicates at least one of uplink control signaling, downlink control signaling, and data of a first subframe, and sends the subframe indication information to a second device, so that the second device determines a type of the first subframe based on the subframe indication information.

According to the method, the first device needs to send, to the second device, only the subframe indication information that indicates at least one of parts of the first subframe, and the second device may determine the type of the first subframe based on the subframe indication information, so as to reduce overheads of the subframe indication information.

In a feasible implementation, when the subframe indication information indicates the uplink control signaling of the first subframe, the subframe indication information indicates a quantity of symbols, a time length, or a time domain location occupied by the uplink control signaling of the first subframe.

According to the method, the first device needs to indicate only the uplink control signaling of the first subframe to the second device, and overheads of the subframe indication information are low.

In a feasible implementation, when the subframe indication information indicates the downlink control signaling of the first subframe, the subframe indication information indicates a quantity of symbols, a time length, or a time domain location occupied by the downlink control signaling of the first subframe.

According to the method, the first device needs to indicate only the downlink control signaling of the first subframe to the second device, and overheads of the subframe indication information are low.

In a feasible implementation, when the subframe indication information indicates the data of the first subframe, the subframe indication information indicates at least one of uplink data, downlink data, and a gap of the first subframe. For example, when the subframe indication information indicates the downlink data of the first subframe, the subframe indication information indicates a quantity of symbols, a time length, or a time domain location occupied by the downlink data of the first subframe. For another example, when the subframe indication information indicates the uplink data of the first subframe, the subframe indication information indicates a quantity of symbols, a time length, or a time domain location occupied by the uplink data of the first subframe. For still another example, when the subframe indication information indicates the gap of the first subframe, the subframe indication information indicates a quantity of symbols, a time length, or a time domain location occupied by the gap of the first subframe.

According to the method, the first device needs to indicate only the data part of the first subframe to the second device, and overheads of the subframe indication information are low.

In a feasible implementation, the downlink control signaling carries first indication information, and the first indication information instructs the second device to receive downlink data of a second subframe.

According to the method, the downlink data is scheduled across subframes.

In a feasible implementation, the downlink control signaling carries second indication information, and the second indication information instructs the second device to send uplink data of a second subframe.

In a feasible implementation, the downlink control signaling further carries third indication information, and the third indication information indicates a time domain resource, a quantity of symbols, and/or a symbol location occupied by the uplink data of the second subframe.

According to the method, the uplink data is scheduled across subframes.

In a feasible implementation, the downlink control signaling carries fourth indication information, and the fourth indication information instructs the second device to feed back, in uplink control signaling of a second subframe, acknowledgement information of the downlink data of the first subframe, or transmit channel state information or a service request in uplink control signaling of a second subframe.

In a feasible implementation, the downlink control signaling further carries fifth indication information, and the fifth indication information indicates a time domain resource, a quantity of symbols, and/or a symbol location occupied by the uplink control signaling of the second subframe.

According to the method, cross-subframe feedback is implemented.

In a feasible implementation, that the first device sends the subframe indication information to a second device includes:

adding, by the first device, the subframe indication information to the downlink control signaling of the first subframe, and sending the downlink control signaling to the second device.

According to the method, the subframe indication information is sent by using the downlink control information.

In a feasible implementation, the adding, by the first device, the subframe indication information to the downlink control signaling of the first subframe, and sending the downlink control signaling to the second device includes:

determining, by the first device, a frequency location and a symbol location of the downlink control signaling of the first subframe; and adding, by the first device, the subframe indication information to the downlink control signaling of the first subframe, and sending the downlink control signaling to the second device at the frequency location and the symbol location.

In a feasible implementation, the determining, by the first device, a frequency location of the downlink control signaling of the first subframe includes:

determining, by the first device, the frequency location based on a cell identifier of a cell in which the second device is located and/or system bandwidth; or determining, by the first device, the frequency location based on a location of a reference signal, where the reference signal is a reference signal of a cell in which the second device is located.

According to the method, channel estimation performance of the subframe indication information can be improved, so as to improve demodulation and decoding performance of the subframe indication information.

In a feasible implementation, that the first device sends the subframe indication information to a second device includes:

adding, by the first device, the subframe indication information to radio resource control RRC signaling or system broadcast information, and sending the RRC signaling or the system broadcast information to the second device.

In a feasible implementation, the adding, by the first device, the subframe indication information to radio resource control RRC signaling or system broadcast information, and sending the RRC signaling or the system broadcast information to the second device includes:

configuring or preconfiguring, by the first device, a correspondence, where the correspondence indicates a correspondence among an index, subframe indication information, and a subframe number; and adding, by the first device, the index to the RRC signaling or the system broadcast information, and sending the RRC signaling or the system broadcast information to the second device.

According to the method, the subframe indication information is sent by using the RRC signaling or the system broadcast information.

According to a second aspect, an embodiment of the present invention provides a subframe type indication method. The method is described from a perspective of a second device. The method includes:

receiving, by a second device, subframe indication information sent by a first device, where the subframe indication information indicates at least one of uplink control signaling, downlink control signaling, and data of a first subframe; and determining, by the second device, a subframe type of the first subframe based on the subframe indication information.

According to the method, the first device needs to send, to the second device, only the subframe indication information that indicates at least one of parts of the first subframe, and correspondingly, the second device receives the subframe indication information, and may determine the type of the first subframe based on the subframe indication information, so as to reduce overheads of the subframe indication information.

In a feasible implementation, when the subframe indication information indicates the uplink control signaling of the first subframe, the subframe indication information indicates a quantity of symbols, a time length, or a time domain location occupied by the uplink control signaling of the first subframe.

In a feasible implementation, when the subframe indication information indicates the downlink control signaling of the first subframe, the subframe indication information indicates a quantity of symbols, a time length, or a time domain location occupied by the downlink control signaling of the first subframe.

In a feasible implementation, when the subframe indication information indicates the data of the first subframe, the subframe indication information indicates at least one of uplink data, downlink data, and a gap of the first subframe.

In a feasible implementation, when the subframe indication information indicates the downlink data of the first subframe, the subframe indication information indicates a quantity of symbols, a time length, or a time domain location occupied by the downlink data of the first subframe.

In a feasible implementation, when the subframe indication information indicates the uplink data of the first subframe, the subframe indication information indicates a quantity of symbols, a time length, or a time domain location occupied by the uplink data of the first subframe.

In a feasible implementation, when the subframe indication information indicates the gap of the first subframe, the subframe indication information indicates a quantity of symbols, a time length, or a time domain location occupied by the gap of the first subframe.

In a feasible implementation, the downlink control signaling carries first indication information, and the method further includes:

receiving, by the second device, downlink data of a second subframe based on the first indication information.

In a feasible implementation, the downlink control signaling carries second indication information of the uplink data, and the method further includes:

sending, by the second device, uplink data of a second subframe based on the second indication information.

In a feasible implementation, the downlink control signaling further carries third indication information, and the third indication information indicates a time domain resource, symbol data, and/or a symbol location occupied by the uplink data of the second subframe.

In a feasible implementation, the downlink control signaling carries fourth indication information, and the method further includes:

based on the fourth indication information, feeding back, by the second device in uplink control signaling of a second subframe, acknowledgement information of the downlink data of the first subframe, or transmitting channel state information or a service request in uplink control signaling of a second subframe.

In a feasible implementation, the downlink control signaling further carries fifth indication information, and the fifth indication information indicates a time domain resource, a quantity of symbols, and/or a symbol location occupied by the uplink control signaling of the second subframe.

In a feasible implementation, the receiving, by a second device, subframe indication information sent by a first device includes:

receiving, by the second device, the subframe indication information by using the downlink control signaling of the first subframe, where the subframe indication information is carried in the downlink control signaling of the first subframe.

In a feasible implementation, the receiving, by the second device, the subframe indication information by using the downlink control signaling of the first subframe includes:

receiving, by the second device, the downlink control signaling sent by the first device at a frequency location and a symbol location, where the frequency location and the symbol location are a frequency location and a symbol location of the downlink control signaling of the first subframe.

In a feasible implementation, the receiving, by a second device, subframe indication information sent by a first device includes:

receiving, by the second device, radio resource control RRC signaling or system broadcast information sent by the first device, where the RRC signaling or the system broadcast information carries the subframe indication information.

In a feasible implementation, the receiving, by the second device, radio resource control RRC signaling or system broadcast information sent by the first device includes:

configuring or preconfiguring, by the second device, a correspondence, where the correspondence indicates a correspondence among an index, subframe indication information, and a subframe number; and receiving, by the second device, the RRC signaling or the system broadcast information that carries the index and that is sent by the first device.

According to a third aspect, an embodiment of the present invention provides a downlink control information sending method. The method is described from a perspective of a first device. The method includes: determining, by a first device, downlink control signaling of a first subframe, where the downlink control signaling carries second indication information, and the second indication information instructs the second device to send uplink data of a second subframe; and sending, by the first device, the downlink control signaling to the second device.

According to the method, the downlink control signaling of the first subframe carries second indication information, and the second indication information instructs the second device to prepare and send the uplink data of the second subframe. In this manner, after receiving subframe indication information, the second device prepares and sends the uplink data of the second subframe based on the second indication information, so as to schedule the uplink data across subframes.

In a feasible implementation, the downlink control signaling further carries third indication information, and the third indication information indicates a time domain resource, a quantity of symbols, and/or a symbol location occupied by the uplink data of the second subframe.

In a feasible implementation, the method further includes:

determining, by the first device, subframe indication information, where the subframe indication information indicates at least one of uplink control signaling, downlink control signaling, and data of the first subframe; and sending, by the first device, the subframe indication information to the second device.

According to a fourth aspect, an embodiment of the present invention provides a downlink control signaling receiving method. The method is described from a perspective of a second device. The method includes:

receiving, by the second device, downlink control signaling sent by a first device, where the downlink control signaling carries second indication information, and the second indication information instructs the second device to send uplink data of a second subframe; and sending, by the second device, the uplink data of the second subframe based on the second indication information.

According to the method, the first device further determines subframe indication information, and sends the subframe indication information to the second device. After receiving the subframe indication information, the second device sends the uplink data of the second subframe. The subframe indication information indicates at least one of uplink control signaling, downlink control signaling, and data of a first subframe.

In a feasible implementation, the downlink control signaling further carries third indication information, and the third indication information indicates a time domain resource, a quantity of symbols, and/or a symbol location occupied by the uplink data of the second subframe.

In a feasible implementation, the method further includes:

receiving, by the second device, the subframe indication information sent by the first device, where the subframe indication information indicates at least one of uplink control signaling, downlink control signaling, and data of a first subframe; and determining, by the second device, a subframe type of the first subframe based on the subframe indication information.

According to a fifth aspect, an embodiment of the present invention provides a device, where the device is a first device, and the first device includes:

a processor, configured to determine subframe indication information, where the subframe indication information indicates at least one of uplink control signaling, downlink control signaling, and data of a first subframe; and a transceiver, configured to send the subframe indication information to a second device.

In a feasible implementation, when the subframe indication information indicates the uplink control signaling of the first subframe, the subframe indication information indicates a quantity of symbols, a time length, or a time domain location occupied by the uplink control signaling of the first subframe.

In a feasible implementation, when the subframe indication information indicates the downlink control signaling of the first subframe, the subframe indication information indicates a quantity of symbols, a time length, or a time domain location occupied by the downlink control signaling of the first subframe.

In a feasible implementation, when the subframe indication information indicates the data of the first subframe, the subframe indication information indicates at least one of uplink data, downlink data, and a gap of the first subframe.

In a feasible implementation, when the subframe indication information indicates the downlink data of the first subframe, the subframe indication information indicates a quantity of symbols, a time length, or a time domain location occupied by the downlink data of the first subframe.

In a feasible implementation, when the subframe indication information indicates the uplink data of the first subframe, the subframe indication information indicates a quantity of symbols, a time length, or a time domain location occupied by the uplink data of the first subframe.

In a feasible implementation, when the subframe indication information indicates the gap of the first subframe, the subframe indication information indicates a quantity of symbols, a time length, or a time domain location occupied by the gap of the first subframe.

In a feasible implementation, the downlink control signaling carries first indication information, and the first indication information instructs the second device to receive downlink data of a second subframe.

In a feasible implementation, the downlink control signaling carries second indication information, and the second indication information instructs the second device to send uplink data of a second subframe.

In a feasible implementation, the downlink control signaling further carries third indication information, and the third indication information indicates a time domain resource, a quantity of symbols, and/or a symbol location occupied by the uplink data of the second subframe.

In a feasible implementation, the downlink control signaling carries fourth indication information, and the fourth indication information instructs the second device to feed back, in uplink control signaling of a second subframe, acknowledgement information of the downlink data of the first subframe, or transmit channel state information or a service request in uplink control signaling of a second subframe.

In a feasible implementation, the downlink control signaling further carries fifth indication information, and the fifth indication information indicates a time domain resource, a quantity of symbols, and/or a symbol location occupied by the uplink control signaling of the second subframe.

In a feasible implementation, the transceiver is specifically configured to: add the subframe indication information to the downlink control signaling of the first subframe, and send the downlink control signaling to the second device.

In a feasible implementation, the processor is further configured to determine a frequency location and a symbol location of the downlink control signaling of the first subframe; and the transceiver is specifically configured to: add the subframe indication information to the downlink control signaling of the first subframe, and send the downlink control signaling to the second device at the frequency location and the symbol location.

In a feasible implementation, the processor is specifically configured to determine the frequency location based on a cell identifier of a cell in which the second device is located and/or system bandwidth; or the processor is specifically configured to determine the frequency location based on a location of a reference signal, where the reference signal is a reference signal of a cell in which the second device is located.

In a feasible implementation, the transceiver is specifically configured to: add the subframe indication information to radio resource control RRC signaling or system broadcast information, and send the RRC signaling or the system broadcast information to the second device.

In a feasible implementation, the processor is further configured to configure or preconfigure a correspondence, where the correspondence indicates a correspondence among an index, subframe indication information, and a subframe number; and the first device adds the index to the RRC signaling or the system broadcast information, and sends the RRC signaling or the system broadcast information to the second device.

According to a sixth aspect, an embodiment of the present invention provides a device, where the device is a second device, and the second device includes:

a transceiver, configured to receive subframe indication information sent by a first device, where the subframe indication information indicates at least one of uplink control signaling, downlink control signaling, and data of a first subframe; and a processor, configured to determine a subframe type of the first subframe based on the subframe indication information.

In a feasible implementation, when the subframe indication information indicates the uplink control signaling of the first subframe, the subframe indication information indicates a quantity of symbols, a time length, or a time domain location occupied by the uplink control signaling of the first subframe.

In a feasible implementation, when the subframe indication information indicates the downlink control signaling of the first subframe, the subframe indication information indicates a quantity of symbols, a time length, or a time domain location occupied by the downlink control signaling of the first subframe.

In a feasible implementation, when the subframe indication information indicates the data of the first subframe, the subframe indication information indicates at least one of uplink data, downlink data, and a gap of the first subframe.

In a feasible implementation, when the subframe indication information indicates the downlink data of the first subframe, the subframe indication information indicates a quantity of symbols, a time length, or a time domain location occupied by the downlink data of the first subframe.

In a feasible implementation, when the subframe indication information indicates the uplink data of the first subframe, the subframe indication information indicates a quantity of symbols, a time length, or a time domain location occupied by the uplink data of the first subframe.

In a feasible implementation, when the subframe indication information indicates the gap of the first subframe, the subframe indication information indicates a quantity of symbols, a time length, or a time domain location occupied by the gap of the first subframe.

In a feasible implementation, the downlink control signaling carries first indication information, and the transceiver is further configured to receive downlink data of a second subframe based on the first indication information.

In a feasible implementation, the downlink control signaling carries second indication information of the uplink data, and the transceiver is further configured to send uplink data of a second subframe based on the second indication information.

In a feasible implementation, the downlink control signaling further carries third indication information, and the third indication information indicates a time domain resource, symbol data, and/or a symbol location occupied by the uplink data of the second subframe.

In a feasible implementation, the downlink control signaling carries fourth indication information, and the transceiver is further configured to: based on the fourth indication information, feed back, in uplink control signaling of a second subframe, acknowledgement information of the downlink data of the first subframe, or transmit channel state information or a service request in uplink control signaling of a second subframe.

In a feasible implementation, the downlink control signaling further carries fifth indication information, and the fifth indication information indicates a time domain resource, a quantity of symbols, and/or a symbol location occupied by the uplink control signaling of the second subframe.

In a feasible implementation, the transceiver is specifically configured to receive the subframe indication information by using the downlink control signaling of the first subframe, and the subframe indication information is carried in the downlink control signaling of the first subframe.

In a feasible implementation, the transceiver is specifically configured to receive the downlink control signaling sent by the first device at a frequency location and a symbol location, and the frequency location and the symbol location are a frequency location and a symbol location of the downlink control signaling of the first subframe.

In a feasible implementation, the transceiver is specifically configured to receive radio resource control RRC signaling or system broadcast information sent by the first device, and the RRC signaling or the system broadcast information carries the subframe indication information.

In a feasible implementation, the processor is further configured to configure or preconfigure a correspondence, where the correspondence indicates a correspondence among an index, subframe indication information, and a subframe number; and the transceiver is specifically configured to receive the RRC signaling or the system broadcast information that carries the index and that is sent by the first device.

According to a seventh aspect, an embodiment of the present invention provides a device, where the device is a first device, and the first device includes:

a processor, configured to determine downlink control signaling of a first subframe, where the downlink control signaling carries second indication information, and the second indication information instructs the second device to send uplink data of a second subframe; and a transceiver, configured to send the downlink control signaling to the second device.

In a feasible implementation, the downlink control signaling further carries third indication information, and the third indication information indicates a time domain resource, a quantity of symbols, and/or a symbol location occupied by the uplink data of the second subframe.

In a feasible implementation, the processor is further configured to determine subframe indication information, where the subframe indication information indicates at least one of uplink control signaling, downlink control signaling, and data of the first subframe; and the transceiver is further configured to send the subframe indication information to the second device.

According to an eighth aspect, an embodiment of the present invention provides a device, where the device is a second device, and the second device includes:

a transceiver, configured to receive downlink control signaling sent by a first device, where the downlink control signaling carries second indication information, and the second indication information instructs the second device to send uplink data of a second subframe; and a processor, configured to instruct the transceiver to send the uplink data of the second subframe based on the second indication information.

In a feasible implementation, the downlink control signaling further carries third indication information, and the third indication information indicates a time domain resource, a quantity of symbols, and/or a symbol location occupied by the uplink data of the second subframe.

In a feasible implementation, the transceiver is further configured to receive subframe indication information sent by the first device, where the subframe indication information indicates at least one of uplink control signaling, downlink control signaling, and data of the first subframe; and the processor is further configured to determine a subframe type of the first subframe based on the subframe indication information.

According to a ninth aspect, an embodiment of the present invention provides a first device, and the first device has a function of implementing behavior of the first device in the foregoing first aspect. The function may be implemented by hardware, or may be implemented by hardware by executing corresponding software. The hardware or the software includes one or more units corresponding to the foregoing function.

In a possible implementation, a structure of the first device includes a processor and a transmitter. The processor is configured to support the first device in performing corresponding functions in the foregoing method. The transmitter is configured to support communication between first devices, and send information or an instruction related in the foregoing method to the first device. The first device may further include a memory. The memory is configured to couple to the processor, and the memory stores a program instruction and data that are necessary for the first device.

According to a tenth aspect, an embodiment of the present invention provides a second device, and the second device has a function of implementing behavior of the second device in the foregoing first aspect. The function may be implemented by hardware, or may be implemented by hardware by executing corresponding software. The hardware or the software includes one or more units corresponding to the foregoing function.

In a possible implementation, a structure of the second device includes a processor and a transmitter. The processor is configured to support the second device in performing corresponding functions in the foregoing method. The transmitter is configured to support communication between second devices, and send information or an instruction related in the foregoing method to the second device. The second device may further include a memory. The memory is configured to couple to the processor, and the memory stores a program instruction and data that are necessary for the second device.

According to an eleventh aspect, an embodiment of the present invention provides a first device, and the first device has a function of implementing behavior of the first device in the foregoing third aspect. The function may be implemented by hardware, or may be implemented by hardware by executing corresponding software. The hardware or the software includes one or more units corresponding to the foregoing function.

In a possible implementation, a structure of the first device includes a processor and a transmitter. The processor is configured to support the first device in performing corresponding functions in the foregoing method. The transmitter is configured to support communication between first devices, and send information or an instruction related in the foregoing method to the first device. The first device may further include a memory. The memory is configured to couple to the processor, and stores a program instruction and data that are necessary for the first device.

According to a twelfth aspect, an embodiment of the present invention provides a second device, and the second device has a function of implementing behavior of the second device in the foregoing fourth aspect. The function may be implemented by hardware, or may be implemented by hardware by executing corresponding software. The hardware or the software includes one or more units corresponding to the foregoing function.

In a possible implementation, a structure of the second device includes a processor and a transmitter. The processor is configured to support the second device in performing corresponding functions in the foregoing method. The transmitter is configured to support communication between second devices, and send information or an instruction related in the foregoing method to the second device. The second device may further include a memory. The memory is configured to couple to the processor, and the memory stores a program instruction and data that are necessary for the second device.

According to a thirteenth aspect, an embodiment of the present invention provides a computer storage medium. The computer storage medium is configured to store a computer software instruction used by the first device in the first aspect, and the computer software instruction includes a program designed for executing the foregoing aspect.

According to a fourteenth aspect, an embodiment of the present invention provides a computer storage medium. The computer storage medium is configured to store a computer software instruction used by the second device in the first aspect, and the computer software instruction includes a program designed to perform the foregoing aspects.

According to a fifteenth aspect, an embodiment of the present invention provides a computer storage medium. The computer storage medium is configured to store a computer software instruction used by the first device in the third aspect, and the computer software instruction includes a program designed for performing the foregoing aspect.

According to a sixteenth aspect, an embodiment of the present invention provides a computer storage medium. The computer storage medium is configured to store a computer software instruction used by the second device in the fourth aspect, and the computer software instruction includes a program designed for performing the foregoing aspects.

According to a seventeenth aspect, an embodiment of the present invention provides a chip system, including at least one processor, a memory, an input/output part, and a bus. The at least one processor obtains an instruction in the memory by using the bus, to implement a designed function of the first device in the foregoing method in the first aspect.

According to an eighteenth aspect, an embodiment of the present invention provides a chip system, including at least one processor, a memory, an input/output part, and a bus. The at least one processor obtains an instruction in the memory by using the bus, to implement a designed function of the second device in the foregoing method in the second aspect.

According to a nineteenth aspect, an embodiment of the present invention provides a chip system, including at least one processor, a memory, an input/output part, and a bus. The at least one processor obtains an instruction in the memory by using the bus, to implement a designed function of the first device in the foregoing method in the third aspect.

According to a twentieth aspect, an embodiment of the present invention provides a chip system, including at least one processor, a memory, an input/output part, and a bus. The at least one processor obtains an instruction in the memory by using the bus, to implement a designed function of the second device in the foregoing method in the fourth aspect.

According to the subframe indication method and the device provided in the embodiments of the present invention, the first device determines the subframe indication information that indicates at least one of the uplink control signaling, the downlink control signaling, and the data of the first subframe, and sends the subframe indication information to the second device, so that the second device determines the type of the first subframe based on the subframe indication information. In this process, the first device needs to send, to the second device, only the subframe indication information that indicates at least one of parts of the first subframe, and the second device may determine the type of the first subframe based on the subframe indication information, so as to reduce overheads of the subframe indication information.

DESCRIPTION OF EMBODIMENTS

Figure 1:
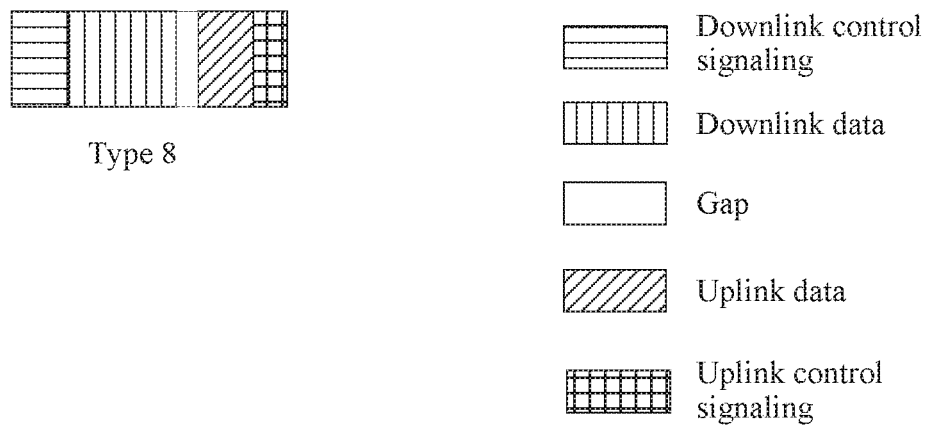
FIG. 1 is a schematic structural diagram of a self-contain subframe.
Figure 2:
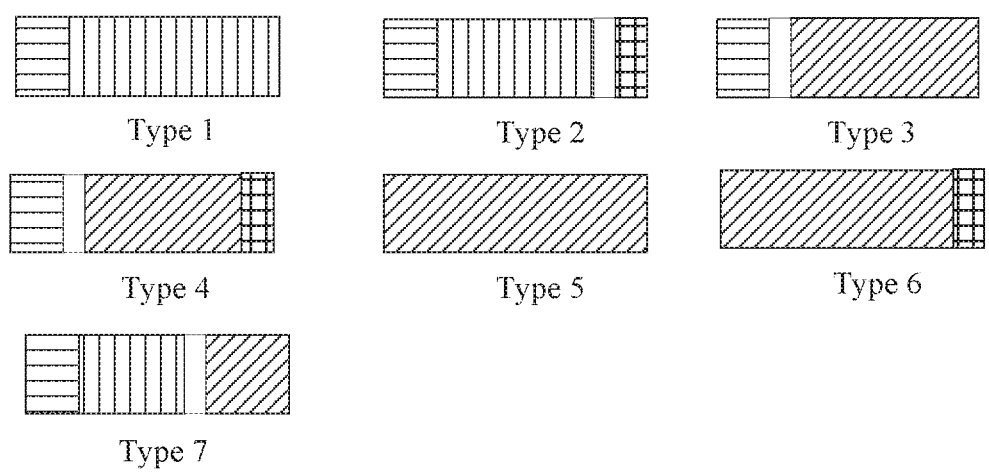
FIG. 2 is a schematic structural diagram of a subframe type obtained after the self-contain subframe shown in FIG. 1 is transformed.

A structure of a self-contain subframe in the future 5G is shown in FIG. 1. After the self-contain subframe in FIG. 1 is transformed, seven types of subframes may be obtained: type 1 to type 7 (Type 1 to Type 7). Specifically, FIG. 2 is a schematic structural diagram of a subframe type obtained after the self-contain subframe shown in FIG. 1 is transformed. A subframe type shown in FIG. 1 is denoted as type 8 (Type 8). With reference to FIG. 1 and FIG. 2, there are eight subframe types in total. Herein, type 1 includes only downlink control information and downlink data; type 2 includes downlink control signaling, downlink data, a gap, and uplink control information; type 3 includes downlink control signaling, a gap, and uplink data; type 4 includes downlink control signaling, a gap, uplink data, and uplink control signaling; type 5 includes only uplink data; type 6 includes only uplink data and uplink control signaling; and type 7 includes downlink control signaling, downlink data, a gap, and uplink data.

In a communication process, a network side device needs to indicate a subframe type of the self-contain subframe to the UE, so that the UE determines, based on the subframe type, a part included in the self-contain subframe, so as to send the uplink control signaling or the uplink data, or receive the downlink data or the downlink control signaling. However, in the self-contain subframe, eight types of self-contain subframe may be obtained by transforming the basic type according to FIG. 1. Further, in each type of subframe, data of symbols occupied by each part is changeable, and further more types of self-contain subframes may be obtained.

Specifically, because type 1 to type 7 are transformation of type 8, the following may be learned from analysis of type 8: It is assumed that a subframe in the 5G is the same as a subframe in the LTE, one subframe includes 14 symbols, the downlink control signaling needs to occupy one, two, or three symbols, and the uplink control signaling needs to occupy one or two symbols. In this case, the downlink control signaling includes four possibilities (zero, one, two, or three symbols); the uplink control includes three possibilities (zero, one, or two symbols); and the gap (Gap) includes two possibilities (zero or one symbol). When a first symbol and a last symbol are not considered, there are 12 possible gap locations. Therefore, the gap includes 13 possibilities (including a case in which the gap occupies zero symbols). Locations and sizes of the uplink data and the downlink data are differentiated based on different gap locations. Therefore, there are 4×3×13=156 subframe types in total. If an indication is required, subframe indication information requires 8 bits (bit), and signaling overheads are very large.

In view of this, the embodiments of the present invention provide a frame indication method and a device, so as to reduce overheads of the subframe indication information.

The technology described in this specification may be applied to various communications systems in which various types of terminals exist, for example, a Global System for Mobile Communications (Global System for Mobile communications, GSM), a Code Division Multiple Access (Code Division Multiple Access, CDMA) system, a Time Division Multiple Access (Time Division Multiple Access, TDMA) system, a Wideband Code Division Multiple Access (Wideband Code Division Multiple Access Wireless. WCDMA) system, a Frequency Division Multiple Access (Frequency Division Multiple Addressing, FDMA) system, an orthogonal frequency division multiple access (Orthogonal Frequency Division Multiple Access, OFDMA) system, a single carrier FDMA (SC-FDMA) system, a general packet radio service (General Packet Radio Service, GPRS) system, a Long Term Evolution (Long Term Evolution, LTE) system, an E-UTRA system, a 5G mobile communications system, and another communications system of this type.

A first device related in this embodiment of the present invention is, for example, a network side device. The first device may be a base station, an access point (Access Point, AP), or the like. The base station may be a device that communicates with the wireless terminal over an air interface in an access network by using one or more sectors. The base station may be configured to mutually convert a received over-the-air frame and an IP packet and serve as a router between the wireless terminal and a rest part of the access network, where the rest part of the access network may include an Internet Protocol (IP) network. The base station may coordinate attribute management of the air interface. For example, the base station may be a base transceiver station (Base Transceiver Station, BTS) in GSM or CDMA, or may be a NodeB (NodeB) in WCDMA, or may be an evolved NodeB (NodeB, eNB, or e-NodeB, evolved Node B) in LTE, or a 5G base station. This is not limited in this application.

A second device related in this embodiment of the present invention is, for example, user equipment. The second device may be a wired terminal or a wireless terminal. The wireless terminal may be a device that provides a user with voice and/or data connectivity, a handheld device with a wireless connection function, or another processing device connected to a radio modem. The wireless terminal may communicate with one or more core networks through a radio access network (such as a RAN, a Radio Access Network, a 5G RAN, or a non-3GPP RAN). The wireless terminal may be a mobile terminal such as a mobile phone (also referred to as a "cellular" phone) or a computer with a mobile terminal. For example, the wireless terminal may be a portable, pocket-sized, handheld, computer built-in, or in-vehicle mobile apparatus that exchanges voice and/or data with the radio access network. For example, the wireless terminal may be a device such as a personal communication service (Personal Communication Service, PCS) phone, a cordless telephone set, a Session Initiation Protocol (SIP) phone, a wireless local loop (Wireless Local Loop, WLL) station, or a personal digital assistant (Personal Digital Assistant. PDA). The wireless terminal may also be referred to as a system, a subscriber unit (Subscriber Unit), a subscriber station (Subscriber Station), a mobile station (Mobile Station), a mobile (Mobile), a remote station (Remote Station), a remote terminal (Remote Terminal), an access terminal (Access Terminal), a user terminal (User Terminal), a user agent (User Agent), a user device (User Device), or user equipment (User Equipment).

Figure 3:
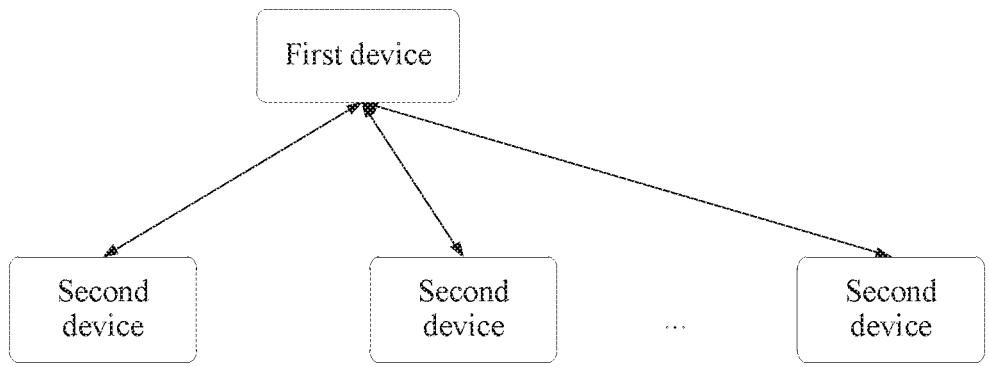
FIG. 3 is a schematic diagram of a system architecture applicable to a subframe indication method according to the present invention.

FIG. 3 is a schematic diagram of a system architecture applicable to a subframe indication method according to the present invention. Referring to FIG. 3, the system architecture includes at least one first device and at least one second device. A communication connection is established between the first device and each second device. The following describes in detail the subframe indication method described in this embodiment of the present invention based on FIG. 3. For details, refer to FIG. 4.

Figure 4:
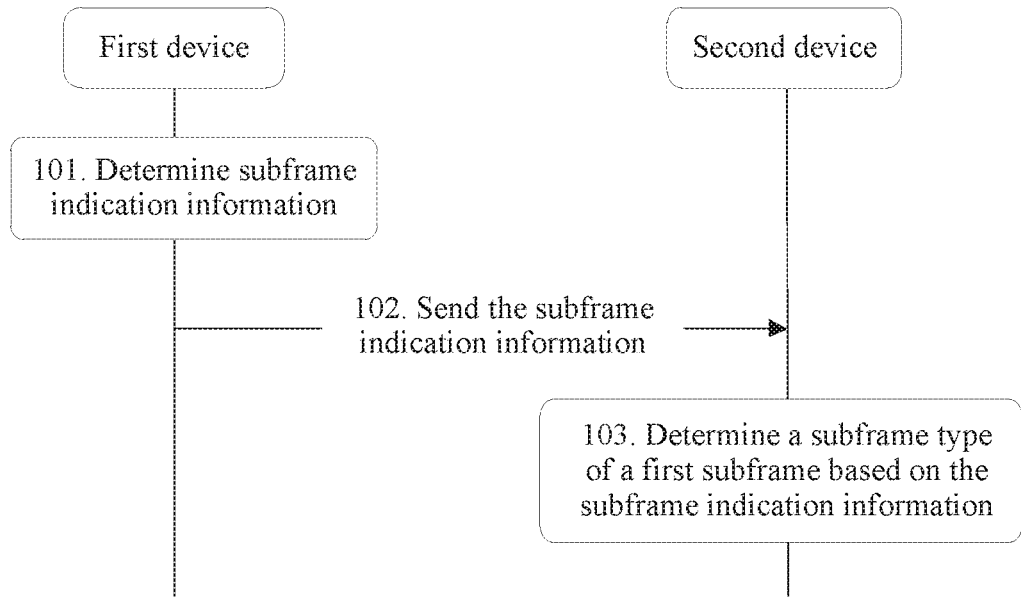
FIG. 4 is a signaling diagram of Embodiment 1 of a subframe indication method according to the present invention.

FIG. 4 is a signaling diagram of Embodiment 1 of a subframe indication method according to the present invention. The method includes the following steps.

101. A first device determines subframe indication information.

In this step, the first device determines subframe indication information that indicates at least one part of a first subframe. The subframe indication information indicates at least one of uplink control signaling, downlink control signaling, and data of the first subframe, and the data includes uplink data, downlink data, and/or a gap. For example, the subframe indication information indicates the uplink control signaling, the downlink control information, and the data part of the first subframe. For another example, the subframe indication information indicates the uplink control signaling and the downlink control signaling of the first subframe. For still another example, the subframe indication information indicates the data part of the first subframe. For still another example, the subframe indication information indicates the uplink control signaling and the data part of the first subframe. For still another example, the subframe indication information indicates the downlink control signaling and the data part of the first subframe. For still another example, the subframe indication information indicates the downlink control signaling of the first subframe. For still another example, the subframe indication information indicates the uplink control signaling of the first subframe. When the subframe indication information indicates each part of the first subframe, the subframe indication information indicates at least one of a quantity of symbols, a time length, or a time domain location occupied by each part. The symbol is, for example, an orthogonal frequency division multiplexing (Orthogonal Frequency Division Multiplexing. OFDM) symbol. This is not limited in the present invention.

102. The first device sends the subframe indication information to a second device.

After determining the subframe indication information, the first device sends the subframe indication information to the second device.

103. The second device determines a subframe type of the first subframe based on the subframe indication information.

In this step, after receiving the subframe indication information, the second device determines the subframe type of the first subframe based on the subframe indication information. For example, if the subframe indication information indicates the uplink control signaling, the downlink control signaling, and the data part of the first subframe, the second device determines, from the first subframe, that a type of the first subframe is a subframe type of type 2, type 4, or type 8, and may further determine a specific type of the subframe based on the quantity of symbols, the time length, or the time domain location occupied by each part.

According to the subframe indication method provided in this embodiment of the present invention, the first device determines the subframe indication information that indicates at least one of the uplink control signaling, the downlink control signaling, and the data of the first subframe, and sends the subframe indication information to the second device, so that the second device determines the type of the first subframe based on the subframe indication information. In this process, the first device needs to send, to the second device, only the subframe indication information that indicates at least one of parts of the first subframe, and the second device may determine the type of the first subframe based on the subframe indication information, so as to reduce overheads of the subframe indication information.

Optionally, in an embodiment of the present invention, when the subframe indication information indicates the uplink control signaling of the first subframe, the subframe indication information indicates a quantity of symbols, a time length, or a time domain location occupied by the uplink control signaling of the first subframe. In this manner, the first device needs to indicate only the uplink control signaling of the first subframe to the second device, and overheads of the subframe indication information are low.

Optionally, in an embodiment of the present invention, when the subframe indication information indicates the downlink control signaling of the first subframe, the subframe indication information indicates a quantity of symbols, a time length, or a time domain location occupied by the downlink control signaling of the first subframe. In this manner, the first device needs to indicate only the downlink control signaling of the first subframe to the second device, and overheads of the subframe indication information are low.

Optionally, in an embodiment of the present invention, when the subframe indication information indicates the data of the first subframe, the subframe indication information indicates at least one of the uplink data, the downlink data, and the gap of the first subframe. For example, when the subframe indication information indicates the downlink data of the first subframe, the subframe indication information indicates a quantity of symbols, a time length, or a time domain location occupied by the downlink data of the first subframe. For another example, when the subframe indication information indicates the uplink data of the first subframe, the subframe indication information indicates a quantity of symbols, a time length, or a time domain location occupied by the uplink data of the first subframe. For still another example, when the subframe indication information indicates the gap of the first subframe, the subframe indication information indicates a quantity of symbols, a time length, or a time domain location occupied by the gap of the first subframe. In this manner, the first device needs to indicate only the data part of the first subframe to the second device, and overheads of the subframe indication information are low.

Figure 5A:
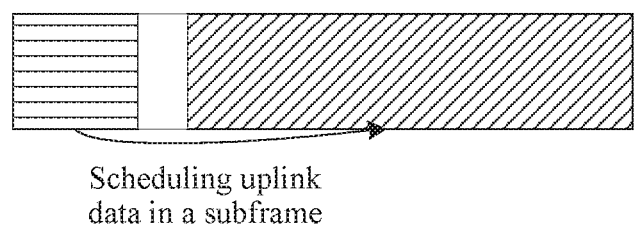
FIG. 5A is a schematic diagram of scheduling uplink data in a subframe by using downlink control signaling in a subframe indication method according to the present invention.
Figure 5B:
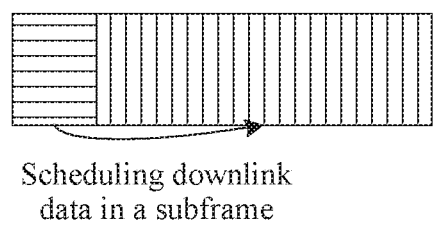
FIG. 5B is a schematic diagram of scheduling downlink data in a subframe by using downlink control signaling in a subframe indication method according to the present invention.
Figure 5C:
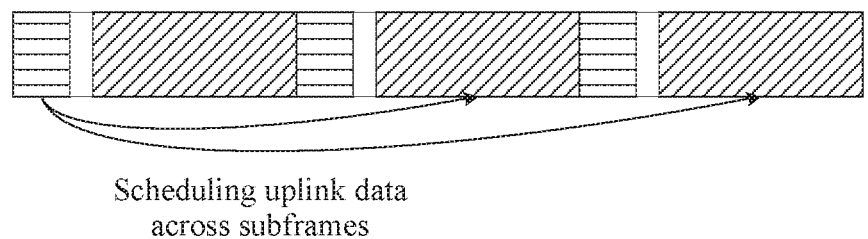
FIG. 5C is a schematic diagram of scheduling uplink data across subframes by using downlink control signaling in a subframe indication method according to the present invention.
Figure 5D:
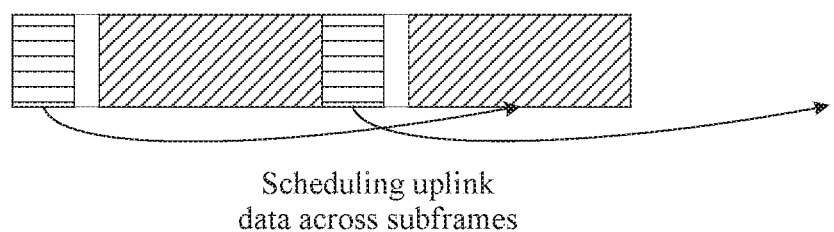
FIG. 5D is another schematic diagram of scheduling uplink data across subframes by using downlink control signaling in a subframe indication method according to the present invention.
Figure 5E:
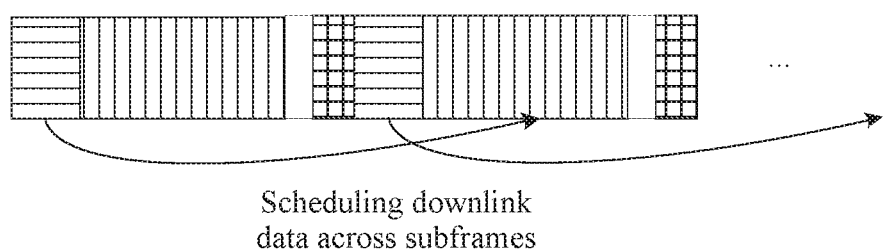
FIG. 5E is a schematic diagram of scheduling downlink data across subframes by using downlink control signaling in a subframe indication method according to the present invention.

In the foregoing embodiment, the downlink control signaling of the first subframe may be used to schedule data in this subframe or schedule data across subframes. Specifically, FIG. 5A is a schematic diagram of scheduling uplink data in a subframe by using downlink control signaling in a subframe indication method according to the present invention; FIG. 5B is a schematic diagram of scheduling downlink data in a subframe by using downlink control signaling in a subframe indication method according to the present invention; FIG. 5C is a schematic diagram of scheduling uplink data across subframes by using downlink control signaling in a subframe indication method according to the present invention; FIG. 5D is another schematic diagram of scheduling uplink data across subframes by using downlink control signaling in a subframe indication method according to the present invention; FIG. 5E is a schematic diagram of scheduling downlink data across subframes by using downlink control signaling in a subframe indication method according to the present invention.

Referring to FIG. 5A and FIG. 5B, there are a plurality of pieces of control signaling in the first subframe. Therefore, for the first subframe, uplink data and downlink data can be simultaneously scheduled. For downlink control signaling, only one type of data can be scheduled, to be specific, only uplink data or only downlink data can be scheduled.

Referring to FIG. 5D, when the downlink control signaling of the first subframe is used to schedule data across subframes, downlink data of a second subframe may be scheduled. Specifically, the downlink control signaling of the first subframe carries first indication information, and the first indication information instructs the second device to receive the downlink data of the second subframe. In this manner, after receiving the subframe indication information, the second device receives the downlink data of the second subframe based on the first indication information, so as to schedule the downlink data across subframes.

Referring to FIG. 5C, when the downlink control signaling of the first subframe is used to schedule data across subframes, uplink data of a second subframe may be scheduled. Specifically, the downlink control signaling of the first subframe carries second indication information, and the second indication information instructs the second device to send the uplink data of the second subframe. In this manner, after receiving the subframe indication information, the second device prepares and sends the uplink data of the second subframe based on the second indication information, so as to schedule the uplink data across subframes.

Further, when the downlink control signaling of the first subframe is used to schedule the uplink data of the second subframe, the downlink control signaling of the first subframe further carries third indication information, and the third indication information indicates a time domain resource, a quantity of symbols, and/or a symbol location occupied by the uplink data of the second subframe. In this manner, after receiving the subframe indication information, the second device prepares and sends the uplink data of the second subframe based on the second indication information and the third indication information, so as to schedule the uplink data across subframes.

Figure 6A:
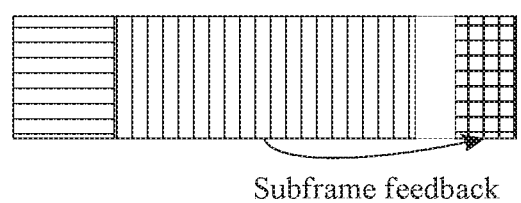
FIG. 6A is a schematic diagram of performing subframe feedback by using uplink control signaling in a subframe indication method according to the present invention.
Figure 6B:
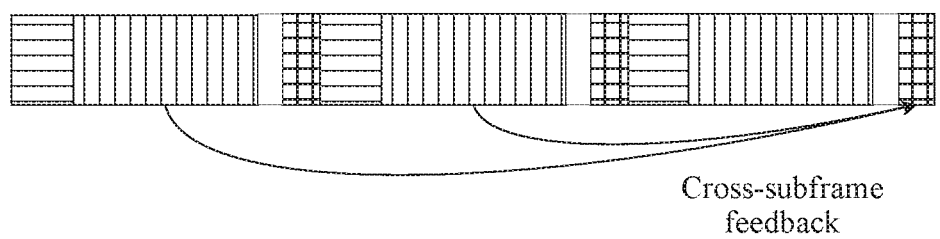
FIG. 6B is a schematic diagram of performing cross-subframe feedback by using uplink control signaling in a subframe indication method according to the present invention.
Figure 6C:
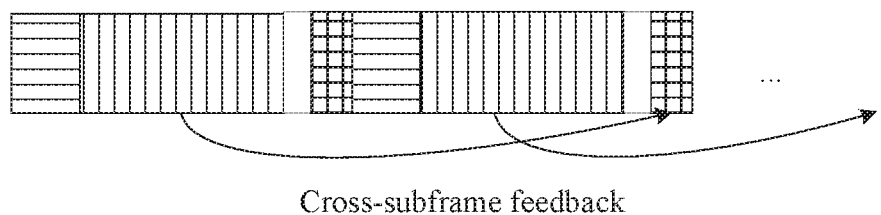
FIG. 6C is another schematic diagram of performing cross-subframe feedback by using uplink control signaling in a subframe indication method according to the present invention.

In the foregoing embodiment, the uplink control signaling may be used to perform subframe feedback or perform cross-subframe scheduling feedback. Specifically, FIG. 6A is a schematic diagram of performing subframe feedback by using uplink control signaling in a subframe indication method according to the present invention; FIG. 6B is a schematic diagram of performing cross-subframe feedback by using uplink control signaling in a subframe indication method according to the present invention; FIG. 6C is another schematic diagram of performing cross-subframe feedback by using uplink control signaling in a subframe indication method according to the present invention.

When the uplink control signaling is used to perform the subframe feedback, acknowledgement information of downlink data of the subframe may be fed back, for example, acknowledgement (Acknowledge, ACK) and negative acknowledgement (Non-Acknowledge, NACK), and channel state information (Channel State Information, CSI), a service request (Service Request, SR), or the like may be fed back. The channel state information CSI includes a channel quality indicator (Channel Quality Indicator, CQI), a precoding matrix indicator (Precoding Matrix Index, PMI), and a rank indicator (Rank Indicator, RI). As shown in FIG. 6A, uplink control signaling of a first subframe is used to feed back acknowledgement information of the downlink data of the subframe, or transmit the channel state information or the service request.

When the uplink control signaling is used to perform the cross-subframe feedback, downlink control signaling of the first subframe carries fourth indication information, and the fourth indication information instructs the second device to feed back, in uplink control signaling of a second subframe, the acknowledgement information of the downlink data of the first subframe, or transmit the channel state information or the service request in uplink control signaling of a second subframe. In FIG. 6B, downlink control signaling of two leftmost subframes each carry fourth indication information, so as to indicate that acknowledgement information of downlink data of the two leftmost subframes is fed back in uplink control signaling of a rightmost subframe, or the channel state information or the service request is transmitted. In FIG. 6C, when ACK/NACK of downlink data of a left subframe needs to be fed back in a right subframe, the right subframe needs to be indicated to downlink control signaling of the left subframe, or otherwise the second device does not know a location at which the ACK/NACK is fed back. After receiving the downlink data of the left subframe, the second device may prepare corresponding ACK/NACK without obtaining a specified feedback frame. Therefore, the downlink control signaling of the left subframe needs to indicate a time domain resource in an uplink feedback or a type of a corresponding feedback subframe, and a subframe in which feedback is performed.

Further, when the uplink control signaling is used to perform the cross-subframe feedback, the downlink control signaling of the first subframe further carries fifth indication information, and the fifth indication information indicates a time domain resource, a quantity of symbols, and/or a symbol location occupied by the uplink control signaling of the second subframe.

Based on the foregoing embodiments, the following lists a feasible method for reducing overheads of subframe indication information. A specific manner is not limited in the present invention. It is assumed that one subframe occupies 14 symbols. For the downlink control signaling and the uplink control signaling, the downlink control signaling needs to occupy one, two, or three symbols, and the uplink control signaling needs to occupy one or two symbols. In this case, the downlink control signaling includes four possibilities (zero, one, two, or three symbols), and the uplink control includes three possibilities (zero, one, or two symbols). If the downlink control signaling and the uplink control signaling need to be indicated, there are 3×4=12 subframe types, and 4 bits are required. A ratio of a capacity (D) of the downlink control signal to a capacity (U) of the uplink control signal ranges from 8:1 to 16:1 in a subframe. Therefore, when the downlink control signaling and the uplink control signaling both exist in one subframe, there may be seven proper cases of the ratio of the downlink control signaling to the uplink control signaling: D:U=1:0, D:U=1:1, D:U=2:0, D:U=2:1, D:U=3:0, D:U=3:1, or D:U=3:2. Therefore, 3 bits are required. For example, 000➔ D:U=1:0; 001➔ D:U=1:1; 010➔ D:U=2:0; 010 ➔ D:U=2:0; 011➔ D:U=2:1; 100➔ D:U=3:0; 101➔ D:U=3:1; 110➔ D:U=3:2; and others (others)➔ reserved (reserve).

For the data part, namely, the uplink data, the downlink data, and the gap, if the second device knows a quantity of symbols occupied by each of the downlink control signaling and the uplink control signaling, a specific location and occupied symbol data of each of the uplink data and the downlink data depend on a gap location. If the gap location is determined, the specific location and the occupied symbol data of each of the uplink data and the downlink data are also determined. It is assumed that the gap (Gap) includes two possibilities (zero or one symbol). When a first symbol and a last symbol are not considered, there are 12 possible gap locations. Therefore, the gap includes 13 possibilities (including a case in which the gap occupies zero symbols), and 4 bits are required. It can be learned with reference to the foregoing analysis of the uplink and control signaling that if a type of an entire subframe is indicated, a size of the subframe indication information is 3+4=7 bits.

Further, the gap location may be indicated by using 2 bits, and different gap locations correspond to different subframe types. For example, 00 means that the gap is located in a first symbol after the downlink control signaling, and ➔ type 3 or type 4; 01 means that the gap is located in a first symbol before the uplink control signaling, and ➔ type 2; 10 means that the gap is between the uplink data and the downlink data, and ➔ type 7 or type 8; and 11 means that the gap is equal to 0, and ➔ type 1, type 5, or type 6. It can be learned with reference to the foregoing analysis of the uplink and downlink control signaling that if the type of the entire subframe is indicated, the size of the subframe indication information is 3+2=5 bits.

It can be learned based on the foregoing analysis that two pieces of signaling or two different parts of one piece of signaling are required to indicate the subframe type, where one piece of signaling or one part of the piece of signaling is used to indicate the uplink control signaling and the downlink control signaling, and the other piece of signaling or the other part of the piece of signaling is used to indicate the gap location and the quantity of symbols. The two pieces of signaling or the two different parts require 5 bits or 7 bits, so as to reduce overheads of the subframe indication information.

The following describes in detail how the first device sends the subframe indication information to the second device in the foregoing embodiments.

In a feasible implementation, the first device adds the subframe indication information to the downlink control signaling of the first subframe, and sends the downlink control signaling to the second device. The downlink control signaling may be common (common) downlink control signaling, and all second devices may receive, demodulate, and decode the downlink control signaling to obtain corresponding information.

Specifically, because the downlink control signaling of the first subframe needs to be used in this manner, the first subframe is a subframe type that includes the downlink control signaling, in other words, this manner is not applicable to a subframe of type 5 and a subframe of type 6. When the first device needs to send the subframe indication information to the second device, the first device determines a frequency location and a symbol location of the downlink control signaling of the first subframe. Then, the first device adds the subframe indication information to the downlink control signaling of the first subframe, and sends the downlink control signaling to the second device at the frequency location and the symbol location.

For example, the first device determines the frequency location based on a cell identifier (identification. ID) of a cell in which the second device is located and/or system bandwidth. The cell identifier is represented by $N_{ID}^{cell}$, and the frequency location is related to $N_{ID}^{cell} \bmod(a \times N_{RB})$, where mod represents modulo, a represents a proportion coefficient, and $N_{RB}$ represents system bandwidth.

For another example, the first device determines the frequency location based on a location of a reference signal, and the reference signal is a reference signal (Reference Signal, RS) of a cell in which the second device is located. Specifically, FIG. 7 is a schematic diagram of determining a frequency location in a subframe indication information method according to the present invention.

Figure 7:
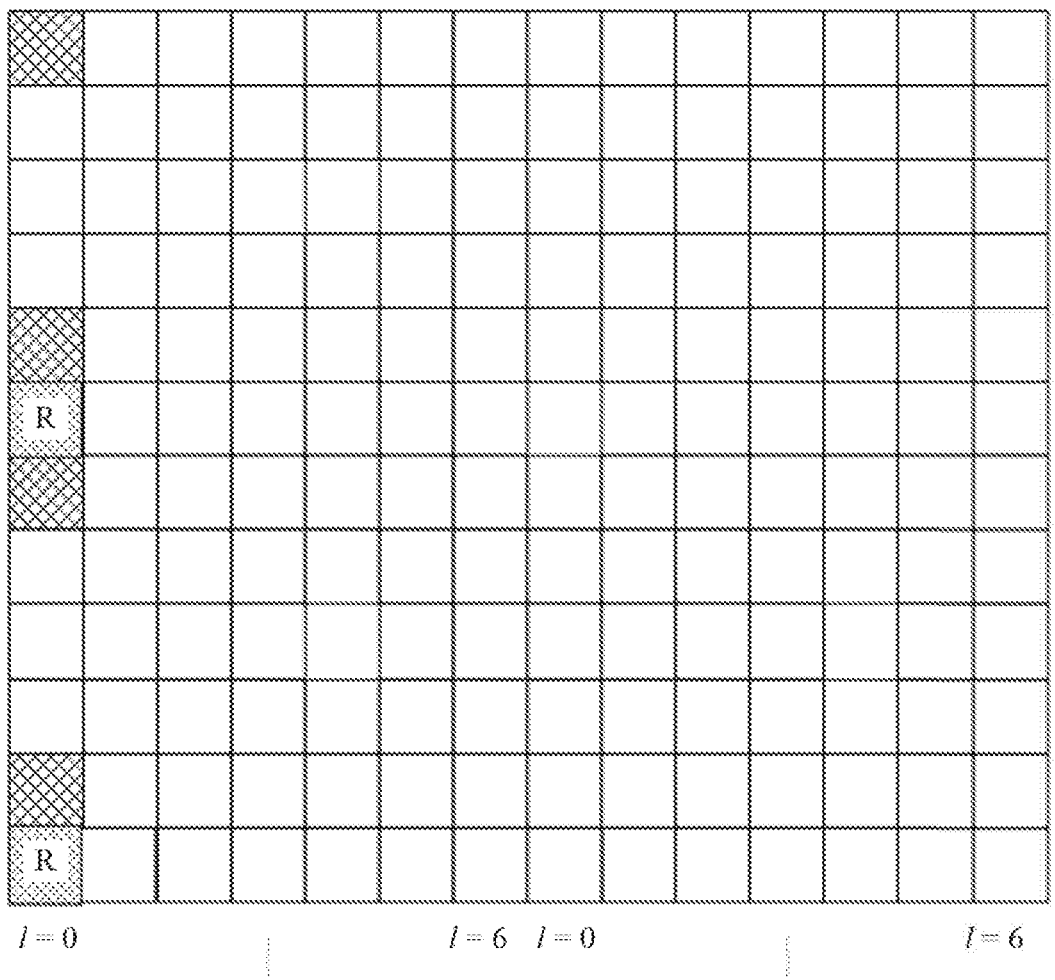
FIG. 7 is a schematic diagram of determining a frequency location in a subframe indication information method according to the present invention.

Referring to FIG. 7, a part filled with points is a frequency location of the reference signal, and a part filled with oblique grids is a frequency location of the downlink control signaling. The frequency location of the downlink control signaling is near the frequency location of the reference signal. For example, the frequency location of the downlink control signaling is adjacent to the frequency location of the reference signal, and a symbol occupied by the downlink control signaling is the same as or adjacent to a symbol occupied by the reference signal. In this way, channel estimation performance of the subframe indication information can be improved, so as to improve demodulation and decoding performance of the subframe indication information.

For another example, in a process of determining the frequency location of the downlink control signaling, a cell identifier of a cell in which the second device is located, system bandwidth, and a location of a reference signal may be further considered.

In addition, when the subframe indication information is sent by using the downlink control signaling of the first subframe, the downlink control signaling further carries other information, for example, time domain information, a modulation scheme, a scrambling manner, and a quantity of repetition times. The subframe indication information is transmitted in a first symbol of the first subframe, so that the second device first obtains the subframe indication information through demodulation, determines the subframe type, and then obtains control signaling and data through demodulation. The demodulation scheme is, for example, quadrature phase shift keying (Quadrature Phase Shift Keying, QPSK). The scrambling manner is related to an initial factor of scrambling code and a cell identifier (cell ID). The quantity of repetition times may be N, to be specific, the subframe indication information may be transmitted in different frequency domain for N times, so as to obtain a diversity reception gain and improve receiving performance.

In another feasible implementation, the first device adds the subframe indication information to radio resource control (Radio Resource Control, RRC) signaling, and sends the radio resource control signaling to the second device.

Specifically, the first device configures or preconfigures a correspondence, where the correspondence indicates a correspondence among an index, subframe indication information, and a subframe number; and then, the first device determines the index, adds the index to the RRC signaling, and sends the RRC signaling to the second device. After receiving the RRC signaling, the second device may determine the index. Because a subframe number of the first subframe is known, the subframe type indicated by the subframe indication information may be determined based on the correspondence.

In an implementation process, different subframe type patterns are designed in a period. For example, one frame includes 10 subframes, each subframe corresponds to a subframe type, the subframe type (Value) is represented by 3 or 5 bits, and the index (Index) is represented by 2 bits. Different indexes correspond to the different subframe type patterns, the subframe type pattern further includes different subframe types represented by different values, and different subframe type patterns correspond to different subframe indication information. For example, the subframe type is 5 bits. When value=00011, first 3 bits 011 represent that D:U=1:0. In other words, all symbols are occupied by the downlink control signaling or the downlink data, and the subframe is an all-downlink subframe. Last 2 bits 11 represent that the subframe is a subframe in which a gap is equal to 0. In other words, the subframe may be a subframe of type 1, type 5, or type 6. In conclusion, a subframe that value=00011 is the subframe of type 1.

In the foregoing embodiment, the index may be a semi-persistent scheduling (semi-persistent scheduling, SPS) index, or the like. The following describes in detail the foregoing correspondence by using an example in which the subframe type (Value) is 5 bits, and the index is the SPS index. For details, refer to Table 1.

It may be learned from table 1 that, the index is 2 bits, and the subframe type (Value) is 5 bits, and corresponds to 0 to 31 in decimal notation, in other words, 32 different combinations. Different values correspond to different subframe indication information, in other words, correspond to different subframe types.

In another possible implementation, the first device adds the subframe indication information to system broadcast information, for example, a master information block (Master Information Block, MIB) or a system information block (System Information Block, SIB), and sends the system broadcast information to the second device. When a subframe type changes, the first device broadcasts, to the second device, system broadcast information corresponding to a new subframe type, and the second device determines the subframe type based on the system broadcast information. In a specific implementation, a correspondence among an index, subframe indication information, and a subframe number may be configured in a manner similar to an RRC signaling sending manner, and the index is added to the system broadcast information and is sent to the second device, so that the second device determines the subframe type based on the system broadcast information.

Figure 8:
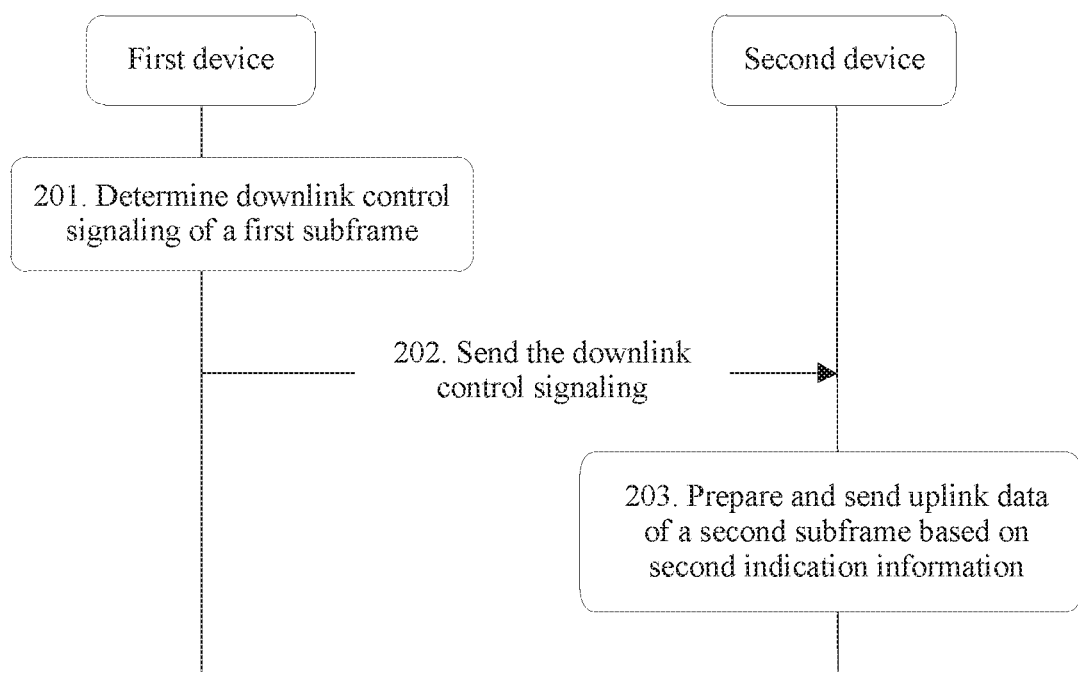
FIG. 8 is a signaling diagram of Embodiment 1 of a downlink control signaling sending method according to the present invention.

FIG. 8 is a signaling diagram of Embodiment 1 of a downlink control signaling sending method according to the present invention. The method includes the following steps.

201. A first device determines downlink control signaling of a first subframe, where the downlink control signaling carries second indication information, and the second indication information instructs the second device to send uplink data of a second subframe.

202. The first device sends the downlink control signaling to the second device.

Correspondingly, the second device receives the downlink control signaling.

203. The second device sends the uplink data of the second subframe based on the second indication information.

In 201 to 203, the downlink control signaling of the first subframe carries second indication information, and the second indication information instructs the second device to prepare and send the uplink data of the second subframe. In this manner, after receiving the downlink control signaling, the second device prepares and sends the uplink data of the second subframe based on the second indication information, so as to schedule the uplink data across subframes.

Optionally, in an embodiment of the present invention, when the downlink control signaling of the first subframe is used to schedule the uplink data of the second subframe, the downlink control signaling of the first subframe further carries third indication information, and the third indication information indicates a time domain resource, a quantity of symbols, and/or a symbol location occupied by the uplink data of the second subframe. In this manner, after receiving the downlink control signaling, the second device prepares and sends the uplink data of the second subframe based on the second indication information and the third indication information, so as to schedule the uplink data across subframes.

It should be noted that, for clarity, the second indication information and the third indication information each are used as separate information in the foregoing embodiment.

TABLE 1

| Value | Subframe number | | | | | | | | | |
|---|---|---|---|---|---|---|---|---|---|---|
| Index | 1 | 2 | 3 | 4 | 5 | 6 | 7 | 8 | 9 | 10 |
| 00 | Value1 | Value2 | Value3 | Value1 | Value2 | Value4 | Value1 | Value2 | Value30 | Value31 |
| 01 | Value2 | Value3 | Value4 | Value5 | Value6 | Value2 | Value3 | Value2 | Value8 | Value9 |
| 10 | Value10 | Value11 | Value12 | Value13 | Value14 | Value15 | Value16 | Value17 | Value18 | Value19 |
| 11 | Value20 | Value21 | Value22 | Value23 | Value24 | Value25 | Value26 | Value27 | Value28 | Value29 |

However, actually, the second indication information includes or is equivalent to the third indication information. In other words, the second indication information includes the third indication information: or the second indication information is the third indication information, in other words, the second indication information is equivalent to the third indication information.

Optionally, in an embodiment of the present invention, the first device further determines subframe indication information and sends the subframe indication information to the second device. After receiving the subframe indication information, the second device sends the uplink data of the second subframe. The subframe indication information indicates at least one of uplink control signaling, downlink control signaling, and data of the first subframe.

According to the downlink control signaling sending method provided in this embodiment of the present invention, the downlink control signaling of the first subframe carries the second indication information, and the second indication information instructs the second device to prepare and send the uplink data of the second subframe. In this manner, after receiving the subframe indication information, the second device prepares and sends the uplink data of the second subframe based on the second indication information, so as to schedule the uplink data across subframes.

Figure 9:
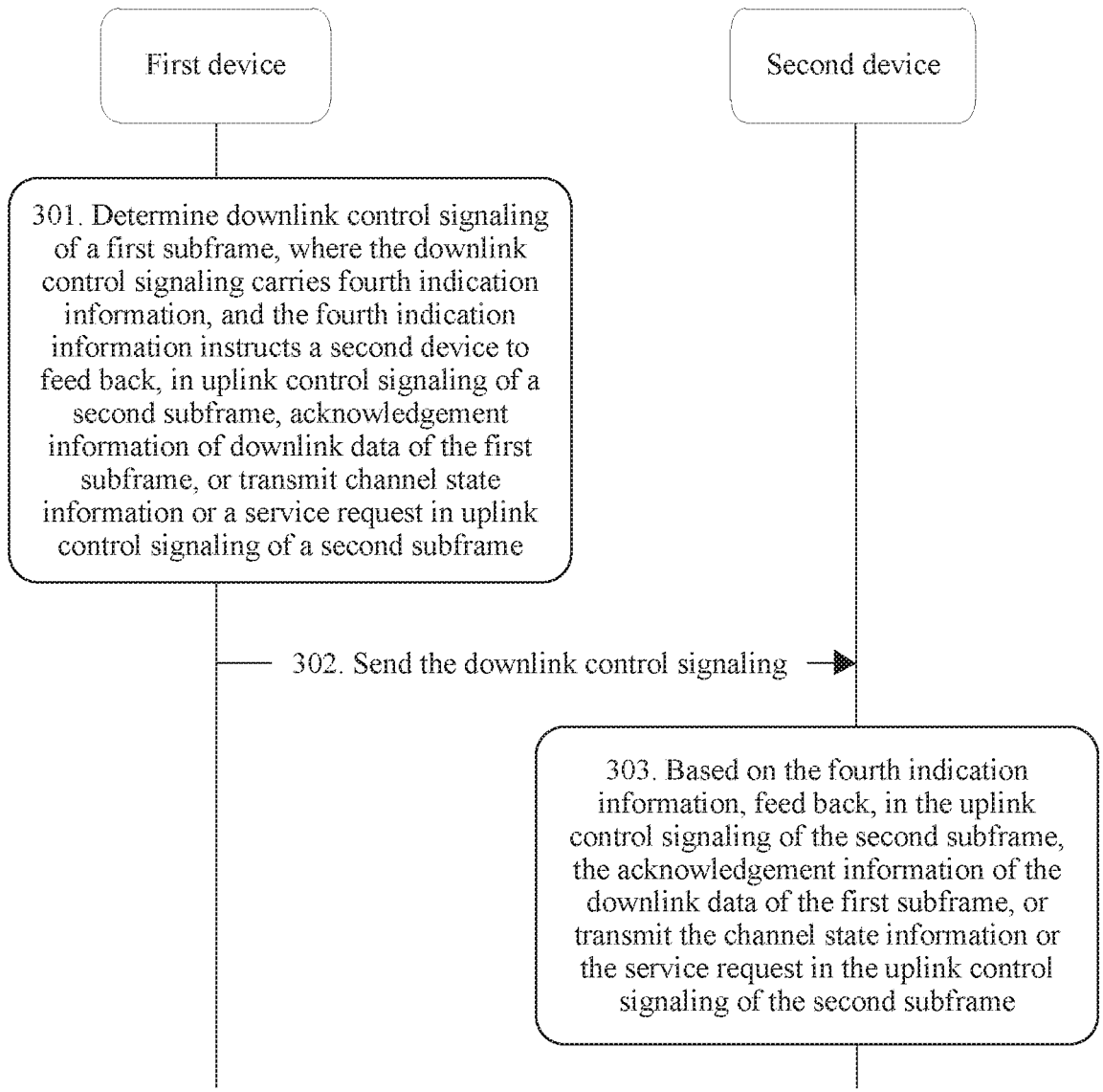
FIG. 9 is a signaling diagram of Embodiment 2 of a downlink control signaling sending method according to the present invention.

FIG. 9 is a signaling diagram of Embodiment 2 of a downlink control signaling sending method according to the present invention. The method includes the following steps.

301. A first device determines downlink control signaling of a first subframe, where the downlink control signaling carries fourth indication information, and the fourth indication information instructs the second device to feed back, in uplink control signaling of a second subframe, acknowledgement information of downlink data of the first subframe, or transmit channel state information or a service request in uplink control signaling of a second subframe.

302. The first device sends the downlink control signaling to the second device.

Correspondingly, the second device receives the downlink control signaling.

303. Based on the fourth indication information, the second device feeds back, in the uplink control signaling of the second subframe, the acknowledgement information of the downlink data of the first subframe, or transmits the channel state information or the service request in the uplink control signaling of the second subframe.

In 301 to 303, the downlink control signaling of the first subframe carries the fourth indication information, and the fourth indication information instructs the second device to feed back, in the uplink control signaling of the second subframe, the acknowledgement information of the downlink data of the first subframe, or transmit the channel state information or the service request in the uplink control signaling of the second subframe. In this manner, after receiving the downlink control signaling, based on the fourth indication information, the second device feeds back, in the uplink control signaling of the second subframe, the acknowledgement information of the downlink data of the first subframe, or transmits the channel state information or the service request in the uplink control signaling of the second subframe, so as to transmit the uplink control signaling across subframes.

Optionally, in an embodiment of the present invention, when the downlink control signaling of the first subframe indicates the uplink control signaling of the second subframe, the downlink control signaling of the first subframe further carries fifth indication information, and the fifth indication information indicates a time domain resource, a quantity of symbols, and/or a symbol location occupied by the uplink control signaling of the second subframe. In this manner, after receiving the downlink control signaling, based on the fourth indication information and the fifth indication information, the second device feeds back, in the uplink control signaling of the second subframe, the acknowledgement information of the downlink data of the first subframe, or transmits the channel state information or the service request in the uplink control signaling of the second subframe, so as to transmit the uplink control signaling across subframes.

It should be noted that, for clarity, second indication information and third indication information each are used as separate information in the foregoing embodiment. However, actually, the fourth indication information includes or is equivalent to the fifth indication information. In other words, the fourth indication information includes the fifth indication information; or the fourth indication information is the fifth indication information, in other words, the fourth indication information is equivalent to the fifth indication information.

Optionally, in an embodiment of the present invention, the first device further determines subframe indication information and sends the subframe indication information to the second device. After receiving the subframe indication information, the second device feeds back, in the uplink control signaling of the second subframe, the acknowledgement information of the downlink data of the first subframe, or transmits the channel state information or the service request in the uplink control signaling of the second subframe. The subframe indication information indicates at least one of uplink control signaling, downlink control signaling, and data of the first subframe.

According to the downlink control signaling sending method provided in this embodiment of the present invention, the downlink control signaling of the first subframe carries the fourth indication information, and the fourth indication information instructs the second device to feed back, in the uplink control signaling of the second subframe, the acknowledgement information of the downlink data of the first subframe, or transmit the channel state information or the service request in the uplink control signaling of the second subframe. In this manner, after receiving the subframe indication information, based on the fourth indication information, the second device feeds back, in the uplink control signaling of the second subframe, the acknowledgement information of the downlink data of the first subframe, or transmits the channel state information or the service request in the uplink control signaling of the second subframe, so as to transmit the uplink control signaling across subframes.

Figure 10:
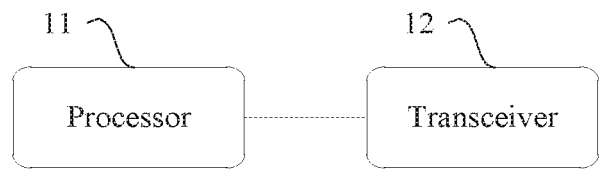
FIG. 10 is a schematic structural diagram of Embodiment 1 of a first device according to the present invention.

FIG. 10 is a schematic structural diagram of Embodiment 1 of a first device according to the present invention. The first device provided in this embodiment may implement steps of the method applied to the first device and provided in FIG. 4 or the optional embodiments of the present invention. A specific implementation process is not described herein. Specifically, the first device provided in this embodiment includes:

a processor 11, configured to determine subframe indication information, where the subframe indication information indicates at least one of uplink control signaling, downlink control signaling, and data of a first subframe; and a transceiver 12, configured to send the subframe indication information to a second device.

The first device provided in this embodiment of the present invention determines the subframe indication information that indicates at least one of the uplink control signaling, the downlink control signaling, and the data of the first subframe, and sends the subframe indication information to the second device, so that the second device determines a type of the first subframe based on the subframe indication information. In this process, the first device needs to send, to the second device, only the subframe indication information that indicates at least one of parts of the first subframe, and the second device may determine the type of the first subframe based on the subframe indication information, so as to reduce overheads of the subframe indication information.

Optionally, in an embodiment of the present invention, when the subframe indication information indicates the uplink control signaling of the first subframe, the subframe indication information indicates a quantity of symbols, a time length, or a time domain location occupied by the uplink control signaling of the first subframe.

Optionally, in an embodiment of the present invention, when the subframe indication information indicates the downlink control signaling of the first subframe, the subframe indication information indicates a quantity of symbols, a time length, or a time domain location occupied by the downlink control signaling of the first subframe.

Optionally; in an embodiment of the present invention, when the subframe indication information indicates the data of the first subframe, the subframe indication information indicates at least one of uplink data, downlink data, and a gap of the first subframe.

Optionally, in an embodiment of the present invention, when the subframe indication information indicates the downlink data of the first subframe, the subframe indication information indicates a quantity of symbols, a time length, or a time domain location occupied by the downlink data of the first subframe.

Optionally; in an embodiment of the present invention, when the subframe indication information indicates the uplink data of the first subframe, the subframe indication information indicates a quantity of symbols, a time length, or a time domain location occupied by the uplink data of the first subframe.

Optionally, in an embodiment of the present invention, when the subframe indication information indicates the gap of the first subframe, the subframe indication information indicates a quantity of symbols, a time length, or a time domain location occupied by the gap of the first subframe.

Optionally, in an embodiment of the present invention, the downlink control signaling carries first indication information, and the first indication information instructs the second device to receive downlink data of a second subframe.

Optionally; in an embodiment of the present invention, the downlink control signaling carries second indication information, and the second indication information instructs the second device to send uplink data of a second subframe.

Optionally, in an embodiment of the present invention, the downlink control signaling further carries third indication information, and the third indication information indicates a time domain resource, a quantity of symbols, and/or a symbol location occupied by the uplink data of the second subframe.

Optionally; in an embodiment of the present invention, the downlink control signaling carries fourth indication information, and the fourth indication information instructs the second device to feed back, in uplink control signaling of a second subframe, acknowledgement information of the downlink data of the first subframe, or transmit channel state information or a service request in uplink control signaling of a second subframe.

Optionally; in an embodiment of the present invention, the downlink control signaling further carries fifth indication information, and the fifth indication information indicates a time domain resource, a quantity of symbols, and/or a symbol location occupied by the uplink control signaling of the second subframe.

Optionally, in an embodiment of the present invention, the transceiver 12 is specifically configured to: add the subframe indication information to the downlink control signaling of the first subframe, and send the downlink control signaling to the second device.

Optionally; in an embodiment of the present invention, the processor 11 is further configured to determine a frequency location and a symbol location of the downlink control signaling of the first subframe; and the transceiver 12 is specifically configured to: add the subframe indication information to the downlink control signaling of the first subframe, and send the downlink control signaling to the second device at the frequency location and the symbol location.

Optionally, in an embodiment of the present invention, the processor 11 is specifically configured to determine the frequency location based on a cell identifier of a cell in which the second device is located and/or system bandwidth; or the processor 11 is specifically configured to determine the frequency location based on a location of a reference signal, where the reference signal is a reference signal of a cell in which the second device is located.

Optionally, in an embodiment of the present invention, the transceiver 12 is specifically configured to: add the subframe indication information to radio resource control RRC signaling or system broadcast information, and send the RRC signaling or the system broadcast information to the second device.

Optionally, in an embodiment of the present invention, the processor 11 is further configured to configure or preconfigure a correspondence, where the correspondence indicates a correspondence among an index, subframe indication information, and a subframe number, and the first device adds the index to the RRC signaling or the system broadcast information, and sends the RRC signaling or the system broadcast information to the second device.

Figure 11:
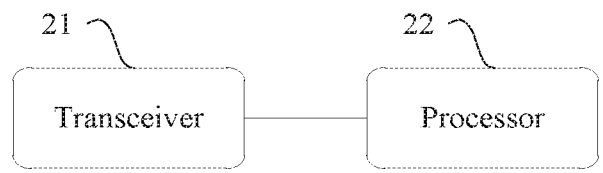
FIG. 11 is a schematic structural diagram of Embodiment 1 of a second device according to the present invention.

FIG. 11 is a schematic structural diagram of Embodiment 1 of a second device according to the present invention. The second device provided in this embodiment may implement steps of the method applied to the second device and provided in FIG. 4 or the optional embodiments of the present invention. A specific implementation process is not described herein. Specifically, the second device provided in this embodiment includes:

a transceiver 21, configured to receive subframe indication information sent by a first device, where the subframe indication information indicates at least one of uplink control signaling, downlink control signaling, and data of a first subframe; and a processor 22, configured to determine a subframe type of the first subframe based on the subframe indication information.

According to the second device provided in this embodiment of the present invention, the first device needs to send, to the second device, only the subframe indication information that indicates at least one of parts of the first subframe, and correspondingly, the second device receives the subframe indication information, and may determine the type of the first subframe based on the subframe indication information, so as to reduce overheads of the subframe indication information.

Optionally, in an embodiment of the present invention, when the subframe indication information indicates the uplink control signaling of the first subframe, the subframe indication information indicates a quantity of symbols, a time length, or a time domain location occupied by the uplink control signaling of the first subframe.

Optionally, in an embodiment of the present invention, when the subframe indication information indicates the downlink control signaling of the first subframe, the subframe indication information indicates a quantity of symbols, a time length, or a time domain location occupied by the downlink control signaling of the first subframe.

Optionally, in an embodiment of the present invention, when the subframe indication information indicates the data of the first subframe, the subframe indication information indicates at least one of uplink data, downlink data, and a gap of the first subframe.

Optionally, in an embodiment of the present invention, when the subframe indication information indicates the downlink data of the first subframe, the subframe indication information indicates a quantity of symbols, a time length, or a time domain location occupied by the downlink data of the first subframe.

Optionally, in an embodiment of the present invention, when the subframe indication information indicates the uplink data of the first subframe, the subframe indication information indicates a quantity of symbols, a time length, or a time domain location occupied by the uplink data of the first subframe.

Optionally, in an embodiment of the present invention, when the subframe indication information indicates the gap of the first subframe, the subframe indication information indicates a quantity of symbols, a time length, or a time domain location occupied by the gap of the first subframe.

Optionally, in an embodiment of the present invention, the downlink control signaling carries first indication information, and the transceiver 21 is further configured to receive downlink data of a second subframe based on the first indication information.

Optionally, in an embodiment of the present invention, the downlink control signaling carries second indication information of the uplink data, and the transceiver 21 is further configured to send uplink data of a second subframe based on the second indication information.

Optionally; in an embodiment of the present invention, the downlink control signaling further carries third indication information, and the third indication information indicates a time domain resource, symbol data, and/or a symbol location occupied by the uplink data of the second subframe.

Optionally, in an embodiment of the present invention, the downlink control signaling carries fourth indication information, and the transceiver 21 is further configured to: based on the fourth indication information, feed back, in uplink control signaling of a second subframe, acknowledgement information of the downlink data of the first subframe, or transmit channel state information or a service request in uplink control signaling of a second subframe.

Optionally, in an embodiment of the present invention, the downlink control signaling further carries fifth indication information, and the fifth indication information indicates a time domain resource, a quantity of symbols, and/or a symbol location occupied by the uplink control signaling of the second subframe.

Optionally; in an embodiment of the present invention, the transceiver 21 is specifically configured to receive the subframe indication information by using the downlink control signaling of the first subframe, and the subframe indication information is carried in the downlink control signaling of the first subframe.

Optionally, in an embodiment of the present invention, the transceiver 21 is specifically configured to receive the downlink control signaling sent by the first device at a frequency location and a symbol location, and the frequency location and the symbol location are a frequency location and a symbol location of the downlink control signaling of the first subframe.

Optionally, in an embodiment of the present invention, the transceiver 21 is specifically configured to receive radio resource control RRC signaling or system broadcast information sent by the first device, and the RRC signaling or the system broadcast information carries the subframe indication information.

Optionally; in an embodiment of the present invention, the processor 22 is further configured to configure or pre-configure a correspondence, where the correspondence indicates a correspondence among an index, subframe indication information, and a subframe number; and the transceiver 21 is specifically configured to receive the RRC signaling or the system broadcast information that carries the index and that is sent by the first device.

Figure 12:
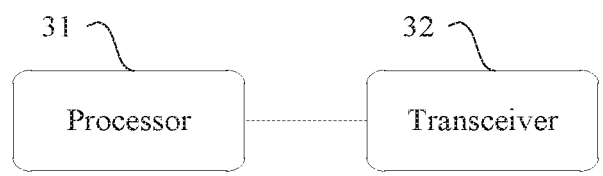
FIG. 12 is a schematic structural diagram of Embodiment 2 of a first device according to the present invention.

FIG. 12 is a schematic structural diagram of Embodiment 2 of a first device according to the present invention. The first device provided in this embodiment may implement steps of the method applied to the first device and provided in FIG. 8 or the optional embodiments of the present invention. A specific implementation process is not described herein. Specifically, the first device provided in this embodiment includes:

a processor 31, configured to determine downlink control signaling of a first subframe, where the downlink control signaling carries second indication information, and the second indication information instructs the second device to send uplink data of a second subframe; and a transceiver 32, configured to send the downlink control signaling to a second device.

According to the first device provided in this embodiment of the present invention, the downlink control signaling of the first subframe carries second indication information, and the second indication information instructs the second device to prepare and send the uplink data of the second subframe. In this manner, after receiving subframe indication information, the second device prepares and sends the uplink data of the second subframe based on the second indication information, so as to schedule the uplink data across subframes.

Optionally, in an embodiment of the present invention, the downlink control signaling further carries third indication information, and the third indication information indicates a time domain resource, a quantity of symbols, and/or a symbol location occupied by the uplink data of the second subframe.

Optionally, in an embodiment of the present invention, the processor 31 is further configured to determine subframe indication information, where the subframe indication information indicates at least one of uplink control signaling, downlink control signaling, and data of the first subframe.

The transceiver 32 is further configured to send the subframe indication information to the second device.

Figure 13:
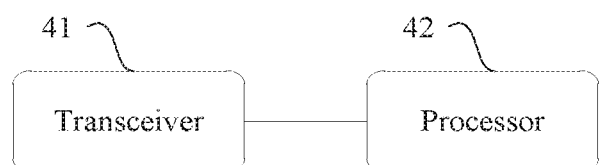
FIG. 13 is a schematic structural diagram of Embodiment 2 of a second device according to the present invention.

FIG. 13 is a schematic structural diagram of Embodiment 2 of a second device according to the present invention. The second device provided in this embodiment may implement steps of the method applied to the second device and provided in FIG. 8 or the optional embodiments of the present invention. A specific implementation process is not described herein. Specifically, the second device provided in this embodiment includes:

a transceiver 41, configured to receive downlink control signaling sent by a first device, where the downlink control signaling carries second indication information, and the second indication information instructs the second device to send uplink data of a second subframe; and a processor 42, configured to: prepare the uplink data of the second subframe based on the second indication information, and send the uplink data by using the transceiver 41.

According to the second device provided in this embodiment of the present invention, the received downlink control signaling of the first subframe carries second indication information, and the second indication information instructs the second device to prepare and send the uplink data of the second subframe. In this manner, after receiving subframe indication information, the second device prepares and sends the uplink data of the second subframe based on the second indication information, so as to schedule the uplink data across subframes.

Optionally, in an embodiment of the present invention, the downlink control signaling further carries third indication information, and the third indication information indicates a time domain resource, a quantity of symbols, and/or a symbol location occupied by the uplink data of the second subframe.

Optionally, in an embodiment of the present invention, the transceiver 41 is further configured to receive subframe indication information sent by the first device, where the subframe indication information indicates at least one of uplink control signaling, downlink control signaling, and data of the first subframe.

The processor 42 is further configured to determine a subframe type of the first subframe based on the subframe indication information.

Persons of ordinary skill in the art may understand that all or some of the steps of the method embodiments may be implemented by a program instructing related hardware. The program may be stored in a computer readable storage medium. When the program is executed, the steps of the method embodiments are performed. The foregoing storage medium includes any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A first device comprising a processor and a memory storing program instruction executable by the processor to cause the first device to perform a method comprising:
   determining subframe indication information indicating one or more of: uplink control signaling, downlink control signaling, or data of a first subframe; and
   sending the subframe indication information to a second device, wherein the second device determines a subframe type of the first subframe based on the subframe indication information, wherein the subframe type indicates a gap location of the first subframe, and wherein the downlink control signaling carries first indication information instructing the second device to feed back, in uplink control signaling of a second subframe, acknowledgement information of downlink data of the first subframe, channel state information, or a service request.

2. The first device of claim 1, wherein the subframe indication information indicates the uplink control signaling of the first subframe, and wherein the subframe indication information comprises:
   a quantity of symbols occupied by the uplink control signaling of the first subframe,
   a time length occupied by the uplink control signaling of the first subframe, or
   a time domain location occupied by the uplink control signaling of the first subframe.

3. The first device of claim 1, wherein the subframe indication information indicates the downlink control signaling of the first subframe, and wherein the subframe indication information comprises:
   a quantity of symbols occupied by the downlink control signaling of the first subframe,
   a time length occupied by the downlink control signaling of the first subframe, or
   a time domain location occupied by the downlink control signaling of the first subframe.

4. The first device of claim 1, wherein the subframe indication information indicates the data of the first subframe, and wherein the subframe indication information comprises at least one of:
   uplink data of the first subframe,
   the downlink data of the first subframe, or
   a gap of the first subframe.

5. The first device of claim 4, wherein the subframe indication information indicates the downlink data of the first subframe, and wherein the subframe indication information comprises:
   a quantity of symbols occupied by the downlink data of the first subframe,
   a time length occupied by the downlink data of the first subframe, or
   a time domain location occupied by the downlink data of the first subframe.

6. The first device of claim 4, wherein the subframe indication information indicates the uplink data of the first subframe, and wherein the subframe indication information comprises:
   a quantity of symbols occupied by the uplink data of the first subframe,
   a time length occupied by the uplink data of the first subframe, or
   a time domain location occupied by the uplink data of the first subframe.

7. The first device of claim 4, wherein the subframe indication information indicates the gap of the first subframe, and wherein the subframe indication information comprises:
   a quantity of symbols occupied by the gap of the first subframe,
   a time length occupied by the gap of the first subframe, or
   a time domain location occupied by the gap of the first subframe.

8. The first device of claim 1, wherein the downlink control signaling further carries second indication information instructing the second device to receive downlink data of the second subframe.

9. The first device of claim 1, wherein the downlink control signaling further carries third indication information instructing the second device to send uplink data of the second subframe, and wherein the downlink control signaling further carries fourth indication information indicating:
   a time domain resource occupied by the uplink data of the second subframe,
   a quantity of symbols occupied by the uplink data of the second subframe, and/or
   a symbol location occupied by the uplink data of the second subframe.

10. The first device of claim 1, wherein the downlink control signaling further carries fifth indication information indicating:
   a time domain resource occupied by the uplink control signaling of the second subframe,
   a quantity of symbols occupied by the uplink control signaling of the second subframe, and/or
   a symbol location occupied by the uplink control signaling of the second subframe.

11. The first device of claim 1, wherein the method performed by the first device further comprises:
   determining a frequency location and a symbol location of the downlink control signaling of the first subframe;
   adding the subframe indication information to the downlink control signaling of the first subframe; and
   sending the downlink control signaling to the second device at the frequency location and the symbol location.

12. The first device of claim 11, wherein determining the frequency location is based on:
   a cell identifier of a cell in which the second device is located,
   system bandwidth, or
   a location of a reference signal of a cell in which the second device is located.

13. A second device comprising a processor and a memory storing program instruction executable by the processor to cause the second device to perform a method comprising:
   receiving subframe indication information from a first device, wherein the subframe indication information indicates at least one of uplink control signaling, downlink control signaling, or data of a first subframe; and
   determining a subframe type of the first subframe based on the subframe indication information, wherein the subframe type indicates a gap location of the first subframe, and wherein the downlink control signaling carries first indication information instructing the second device to feed back, in uplink control signaling of a second subframe, acknowledgement information of downlink data of the first subframe, channel state information, or a service request.

14. The second device of claim 13, wherein the subframe indication information indicates the uplink control signaling of the first subframe, and wherein the subframe indication information comprises:
   a quantity of symbols occupied by the uplink control signaling of the first subframe,
   a time length occupied by the uplink control signaling of the first subframe, or
   a time domain location occupied by the uplink control signaling of the first subframe.

15. The second device of claim 13, wherein the subframe indication information indicates the downlink control signaling of the first subframe, and wherein the subframe indication information comprises:
   a quantity of symbols occupied by the downlink control signaling of the first subframe,
   a time length occupied by the downlink control signaling of the first subframe, or
   a time domain location occupied by the downlink control signaling of the first subframe.

16. The second device of claim 13, wherein the subframe indication information indicates the data of the first subframe, and wherein the subframe indication information comprises at least one of:
   uplink data of the first subframe,
   the downlink data of the first subframe, or
   a gap of the first subframe.

17. The second device of claim 16, wherein the subframe indication information indicates the downlink data of the first subframe, and wherein the subframe indication information comprises:
   a quantity of symbols occupied by the downlink data of the first subframe,
   a time length occupied by the downlink data of the first subframe, or
   a time domain location occupied by the downlink data of the first subframe.

18. The second device of claim 16, wherein the subframe indication information indicates the uplink data of the first subframe, and wherein the subframe indication information comprises:
   a quantity of symbols occupied by the uplink data of the first subframe,
   a time length occupied by the uplink data of the first subframe, or
   a time domain location occupied by the uplink data of the first subframe.

19. The second device of claim 16, wherein the subframe indication information indicates the gap of the first subframe, and wherein the subframe indication information comprises:
   a quantity of symbols occupied by the gap of the first subframe,
   a time length occupied by the gap of the first subframe, or
   a time domain location occupied by the gap of the first subframe.

20. The second device of claim 13, wherein the downlink control signaling further carries second indication information of downlink data and third indication information of uplink data, and wherein the method performed by the second device further comprises:
   receiving downlink data of the second subframe based on the second indication information; and
   sending uplink data of the second subframe based on the third indication information,
   wherein the downlink control signaling further carries fourth indication information, and wherein the fourth indication information indicates:
   a time domain resource occupied by the uplink data of the second subframe,
   a quantity of symbols occupied by the uplink data of the second subframe, and/or
   a symbol location occupied by the uplink data of the second subframe.

* * * * *